United States Patent
Breen et al.

(10) Patent No.: US 12,493,911 B2
(45) Date of Patent: Dec. 9, 2025

(54) PREDICTIVE DATA ANALYSIS OPERATIONS USING A RELATIONSHIP MACHINE LEARNING FRAMEWORK

(71) Applicant: Optum Services (Ireland) Limited, Dublin (IE)

(72) Inventors: Conor Breen, Dublin (IE); Kevin Larkin, Kildare (IE); Octavio Palomo Sanchez, Dublin (IE); Jamie Howard, County Donegal (IE)

(73) Assignee: Optum Services (Ireland) Limited, Dublin (IE)

( * ) Notice: Subject to any disclaimer, the term of this patent is extended or adjusted under 35 U.S.C. 154(b) by 531 days.

(21) Appl. No.: 17/981,326

(22) Filed: Nov. 4, 2022

(65) Prior Publication Data

US 2024/0013308 A1 Jan. 11, 2024

Related U.S. Application Data

(60) Provisional application No. 63/367,844, filed on Jul. 7, 2022.

(51) Int. Cl.
*G06Q 40/08* (2012.01)
*G06N 20/00* (2019.01)

(52) U.S. Cl.
CPC ............. *G06Q 40/08* (2013.01); *G06N 20/00* (2019.01)

(58) Field of Classification Search
CPC ........ G06F 16/13; G06F 16/24; G06F 16/156; G06F 3/1297; G06N 3/00; G06N 5/00; G05B 13/00; H03M 7/30; H04N 9/8042; G06T 9/00
See application file for complete search history.

(56) References Cited

U.S. PATENT DOCUMENTS

| | | | |
|---|---|---|---|
| 8,560,338 B2 | 10/2013 | Kalies, Jr. | |
| 11,256,995 B1* | 2/2022 | Bucher | G06N 5/022 |
| 2002/0103680 A1 | 8/2002 | Newman | |
| 2014/0067423 A1 | 3/2014 | Joao | |
| 2015/0006188 A1 | 1/2015 | Pummill | |
| 2016/0162779 A1* | 6/2016 | Marcus | G06N 20/10 |
| | | | 706/12 |
| 2016/0357933 A1 | 12/2016 | Glassford et al. | |
| 2021/0240556 A1* | 8/2021 | Breen | G06Q 40/08 |
| 2021/0273858 A1* | 9/2021 | Radovanovic | G06Q 50/06 |
| 2021/0390397 A1* | 12/2021 | Alvelda, VII | G06N 3/044 |
| 2022/0188654 A1* | 6/2022 | Knuff | G06N 3/047 |

(Continued)

OTHER PUBLICATIONS

"Delivery System Reform: Improving Care for Individuals Dually Eligible for Medicare and Medicaid," BiPartisan Policy Center, Sep. 2016, (52 pages), available online: https://bipartisanpolicy.org/download/?file=/wp-content/uploads/2019/03/BPC-Health-Dual-Eligible-Recommendations.pdf.

(Continued)

*Primary Examiner* — Hung D Le
(74) *Attorney, Agent, or Firm* — ALSTON & BIRD LLP

(57) ABSTRACT

Various embodiments of the present disclosure provide methods, apparatus, systems, computing devices, computing entities, and/or the like for performing predictive data analysis, wherein an opportunity prediction is generated for an input data object using a relationship matrix database object and based at least in part on a network segment associated with the input data object.

20 Claims, 6 Drawing Sheets

(56) References Cited

U.S. PATENT DOCUMENTS

2023/0017734 A1* 1/2023 Singh ................. G06F 40/20
2023/0359929 A1* 11/2023 Shmilovich ........... G16C 20/30
2024/0013308 A1* 1/2024 Breen .................. G06Q 40/08
2024/0139544 A1* 5/2024 Brunner ............... G16H 10/60

OTHER PUBLICATIONS

Grabowski, David C. "Special Needs Plans and the Coordination Of Benefits and Services For Dual Eligibles," Health Affairs (Millwood), vol. 28, No. 1, Jan.-Feb. 2009, pp. 136-146, DOI: 10.1377/hlthaff.28.1.136.

Sun, Xu et al. "Feature-Frequency-Adaptive On-Line Training For Fast and Accurate natural Language Processing," Association for Computational Linguistics, vol. 40, No. 3, pp. 563-586, Sep. 1, 2014, DOI: 10.1162/COLL_a_00193.

\* cited by examiner

PREDICTIVE DATA ANALYSIS OPERATIONS USING A RELATIONSHIP MACHINE LEARNING FRAMEWORK

CROSS-REFERENCES TO RELATED APPLICATIONS

The present application claims priority to U.S. Provisional Patent Application No. 63/367,844, filed Jul. 7, 2022, which is incorporated herein by reference in its entirety.

BACKGROUND

Various embodiments of the present disclosure address technical challenges related to performing predictive data analysis and disclose techniques for efficiently and effectively performing predictive data analysis operations using relationship machine learning framework.

BRIEF SUMMARY

In general, various embodiments of the present disclosure provide methods, apparatus, systems, computing devices, computing entities, and/or the like for performing predictive data analysis using a relationship machine learning framework. Certain embodiments of the present disclosure utilize systems, methods, and computer program products that perform predictive data analysis using at least one of techniques using relationship machine learning model, techniques using a relationship matrix database object, techniques using per-segment per-entity relationship scores, and/or the like.

In accordance with one aspect, a method is provided. In one embodiment, the method comprises: generating, using one or more processors, a plurality of sets of embeddings for each network segment of a plurality of network segments, wherein (a) the plurality of network segments is associated with a predictive entity, (b) each set of embeddings comprises a relationship feature embedding and a cross-entity relationship feature embedding, and (c) each set of embeddings is associated with a related-predictive entity of a plurality of related-predictive entities; generating, using the one or more processors and a relationship machine-learning framework and based at least in part on the plurality of sets of embeddings, a relationship matrix database object, wherein: (i) the relationship matrix database object is associated with an opportunity prediction query engine and comprises, for each network segment of the plurality of network segments: (1) a plurality of per-segment per-entity relationship scores, each per-segment per-entity relationship score associated with a corresponding related-predictive entity of the plurality of related-predictive entities, and (2) an opportunity prediction of a plurality of opportunity predictions, (ii) the relationship matrix database object is generated using a relationship machine learning model, the relationship machine learning model configured to generate the plurality of per-segment per-entity relationship scores based at least in part on each set of embeddings, and (iii) the plurality of opportunity predictions is generated based at least in part on the plurality of per-segment per-entity relationship scores; generating, using the one or more processors and based at least in part on the plurality of per-segment per-entity relationship scores, the plurality of opportunity predictions; identifying, using the one or more processors, one or more input data objects; for each input data object of the one or more input data objects: generating, using the one or more processors and based at least in part on the relationship matrix database object and a network segment identifier associated with the input data object, a corresponding opportunity prediction for the input data object; and initiating, use the one or more processors, the performance of one or more prediction-based actions based at least in part on the corresponding opportunity prediction.

In accordance with another aspect, an apparatus comprising at least one processor and at least one memory including computer program code is provided. In one embodiment, the at least one memory and the computer program code may be configured to, with the processor, cause the apparatus to: generate a plurality of sets of embeddings for each network segment of a plurality of network segments, wherein (a) the plurality of network segments is associated with a predictive entity, (b) each set of embeddings comprises a relationship feature embedding and a cross-entity relationship feature embedding, and (c) each set of embeddings is associated with a related-predictive entity of a plurality of related-predictive entities; generate, using a relationship machine-learning framework and based at least in part on the plurality of sets of embeddings, a relationship matrix database object, wherein: (i) the relationship matrix database object is associated with an opportunity prediction query engine and comprises, for each network segment of the plurality of network segments: (1) a plurality of per-segment per-entity relationship scores, each per-segment per-entity relationship score associated with a corresponding related-predictive entity of the plurality of related-predictive entities, and (2) an opportunity prediction of a plurality of opportunity predictions, (ii) the relationship matrix database object is generated using a relationship machine learning model, the relationship machine learning model configured to generate the plurality of per-segment per-entity relationship scores based at least in part on each set of embeddings, and (iii) the plurality of opportunity predictions is generated based at least in part on the plurality of per-segment per-entity relationship scores; generating based at least in part on the plurality of per-segment per-entity relationship scores, the plurality of opportunity predictions; identify one or more input data objects; for each input data object of the one or more input data objects: generate, based at least in part on the relationship matrix database object and a network segment identifier associated with the input data object, a corresponding opportunity prediction for the input data object; and initiate the performance of one or more prediction-based actions based at least in part on the corresponding opportunity prediction.

In accordance with yet another aspect, a computer program product is provided. The computer program product may comprise at least one computer-readable storage medium having computer-readable program code portions stored therein, the computer-readable program code portions comprising executable portions configured to: generate a plurality of sets of embeddings for each network segment of a plurality of network segments, wherein (a) the plurality of network segments is associated with a predictive entity, (b) each set of embeddings comprises a relationship feature embedding and a cross-entity relationship feature embedding, and (c) each set of embeddings is associated with a related-predictive entity of a plurality of related-predictive entities; generate, using a relationship machine-learning framework and based at least in part on the plurality of sets of embeddings, a relationship matrix database object, wherein: (i) the relationship matrix database object is associated with an opportunity prediction query engine and comprises, for each network segment of the plurality of network segments: (1) a plurality of per-segment per-entity relationship scores, each per-segment per-entity relationship score associated with a corresponding related-predictive entity of the plurality of related-predictive entities, and (2) an opportunity prediction of a plurality of opportunity predictions, (ii) the relationship matrix database object is generated using a relationship machine learning model, the relationship machine learning model configured to generate the plurality of per-segment per-entity relationship scores based at least in part on each set of embeddings, and (iii) the plurality of opportunity predictions is generated based at least in part on the plurality of per-segment per-entity relationship scores; generating based at least in part on the plurality of per-segment per-entity relationship scores, the plurality of opportunity predictions; identify one or more input data objects; for each input data object of the one or more input data objects: generate, based at least in part on the relationship matrix database object and a network segment identifier associated with the input data object, a corresponding opportunity prediction for the input data object; and initiate the performance of one or more prediction-based actions based at least in part on the corresponding opportunity prediction.

BRIEF DESCRIPTION OF THE DRAWINGS

Figure 1:
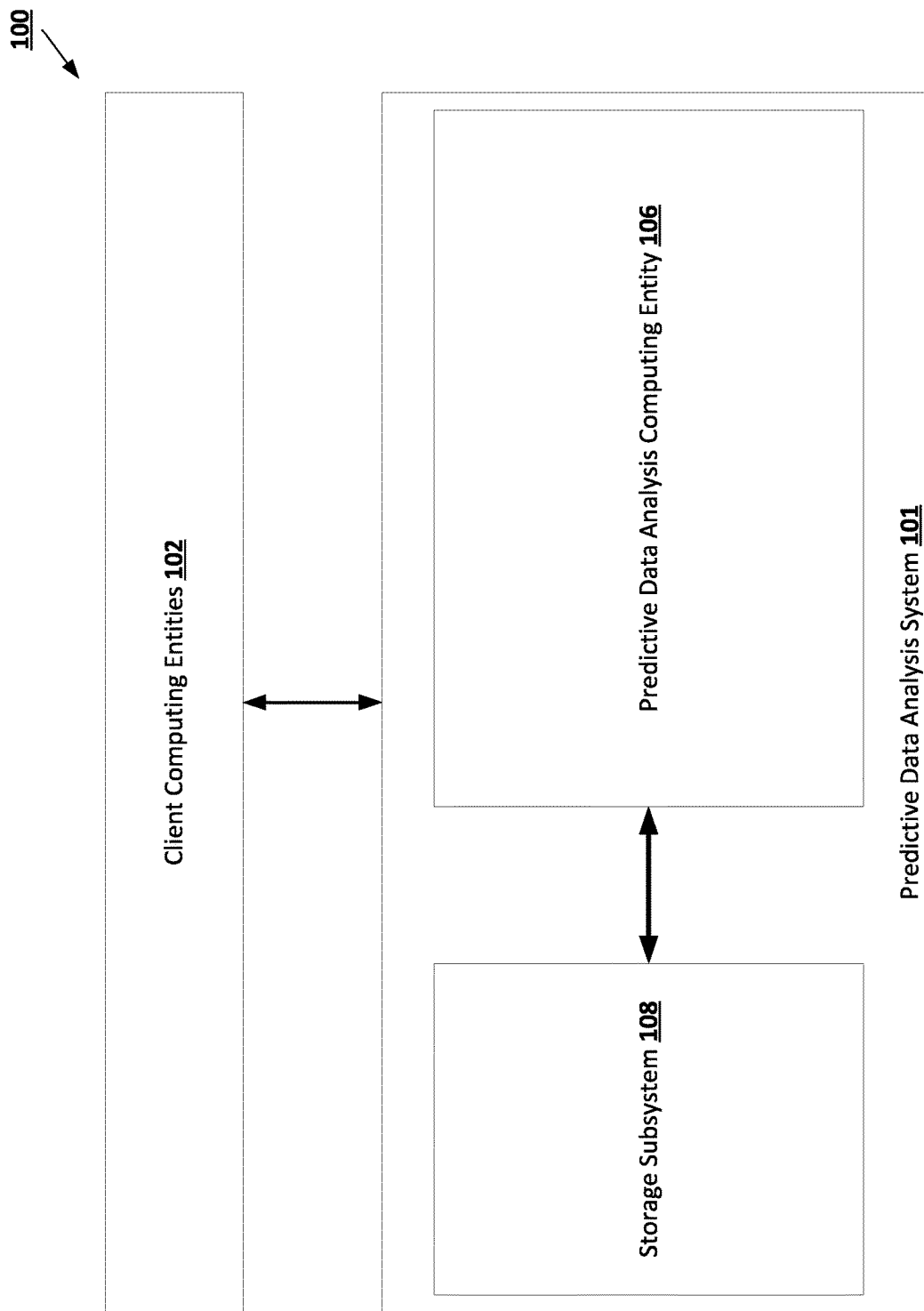

Having thus described the disclosure in general terms, reference will now be made to the accompanying drawings, which are not necessarily drawn to scale, and wherein:

FIG. 1 provides an exemplary overview of an architecture that can be used to practice embodiments of the present disclosure.

Figure 2:
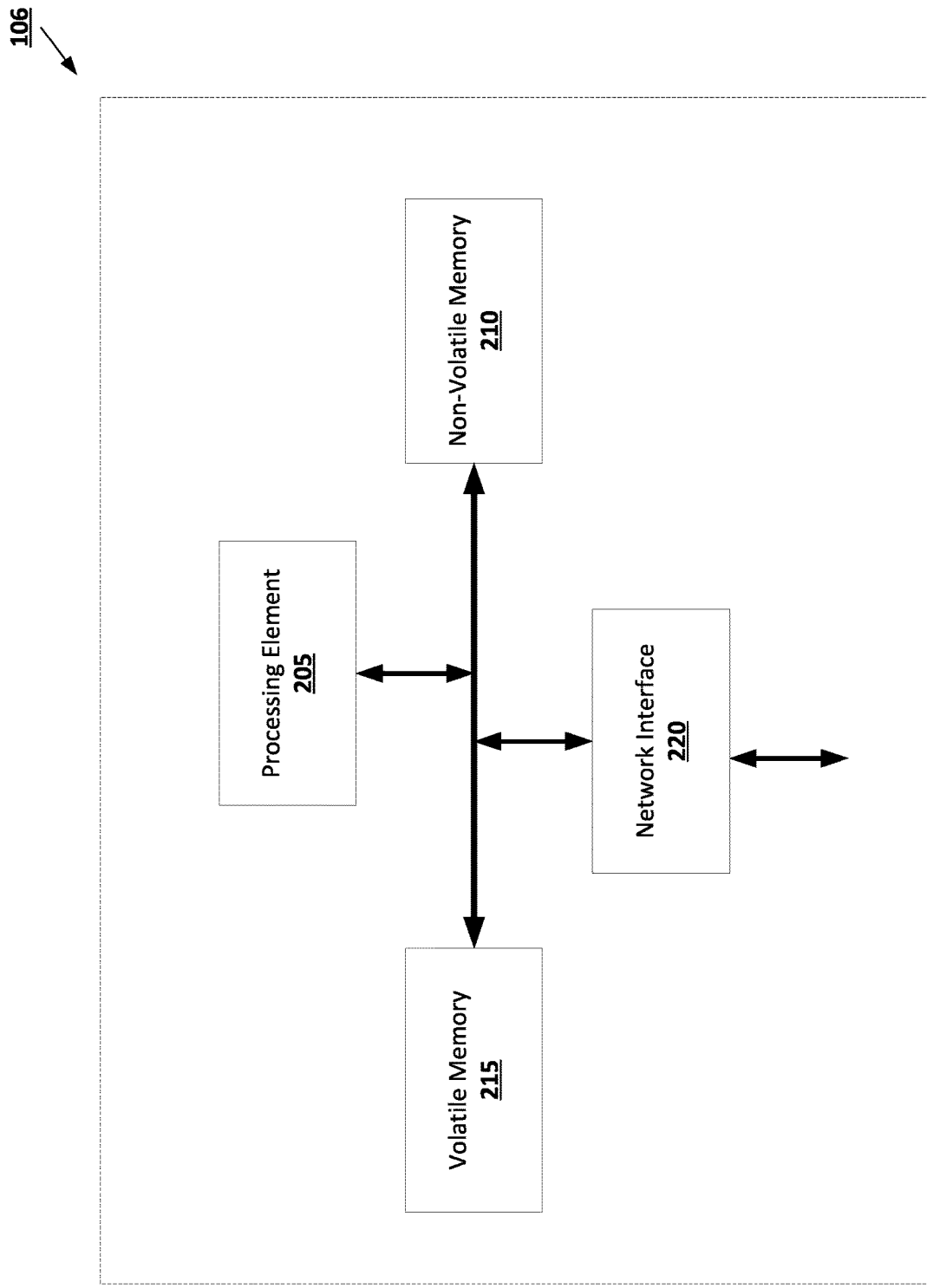

FIG. 2 provides an example predictive data analysis computing entity in accordance with some embodiments discussed herein.

Figure 3:
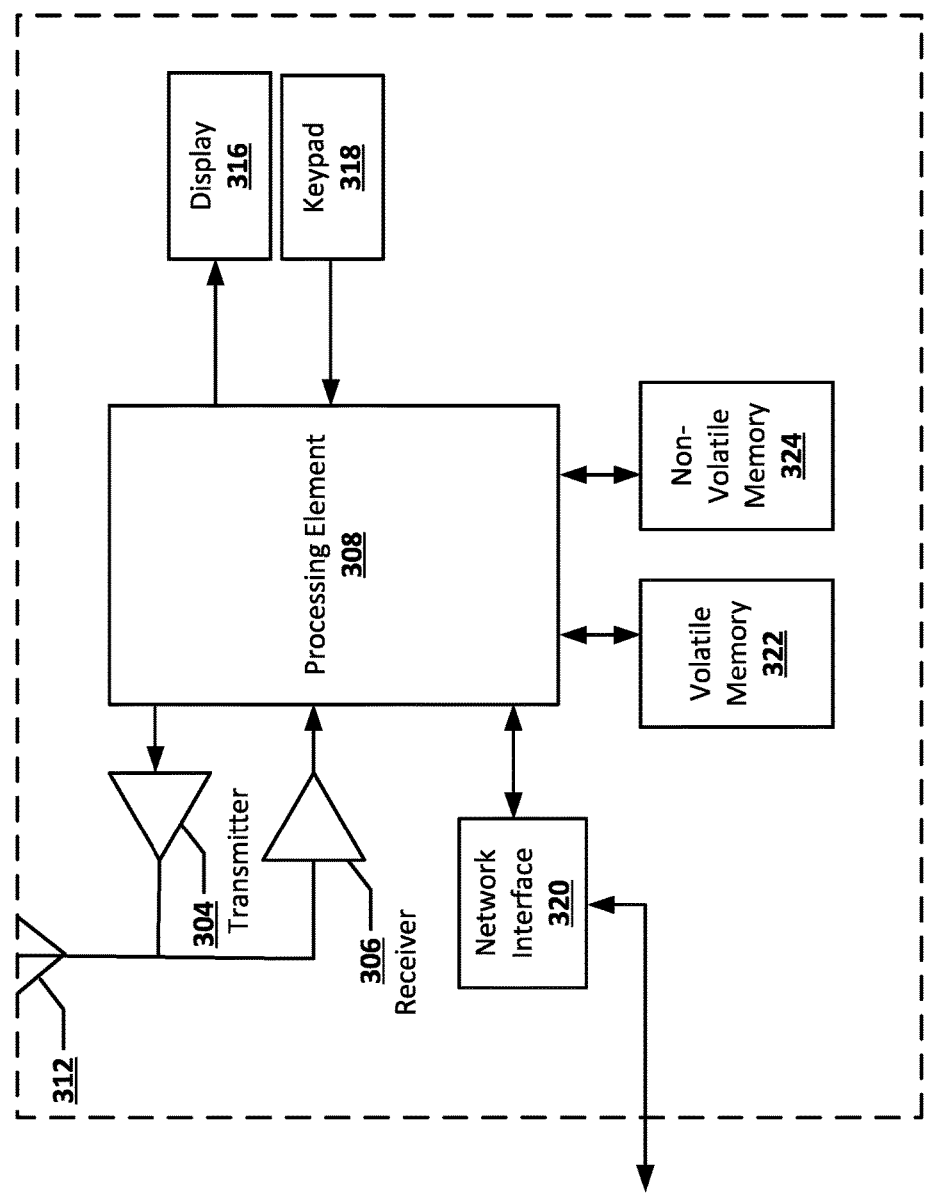

FIG. 3 provides an example client computing entity in accordance with some embodiments discussed herein.

Figure 4:
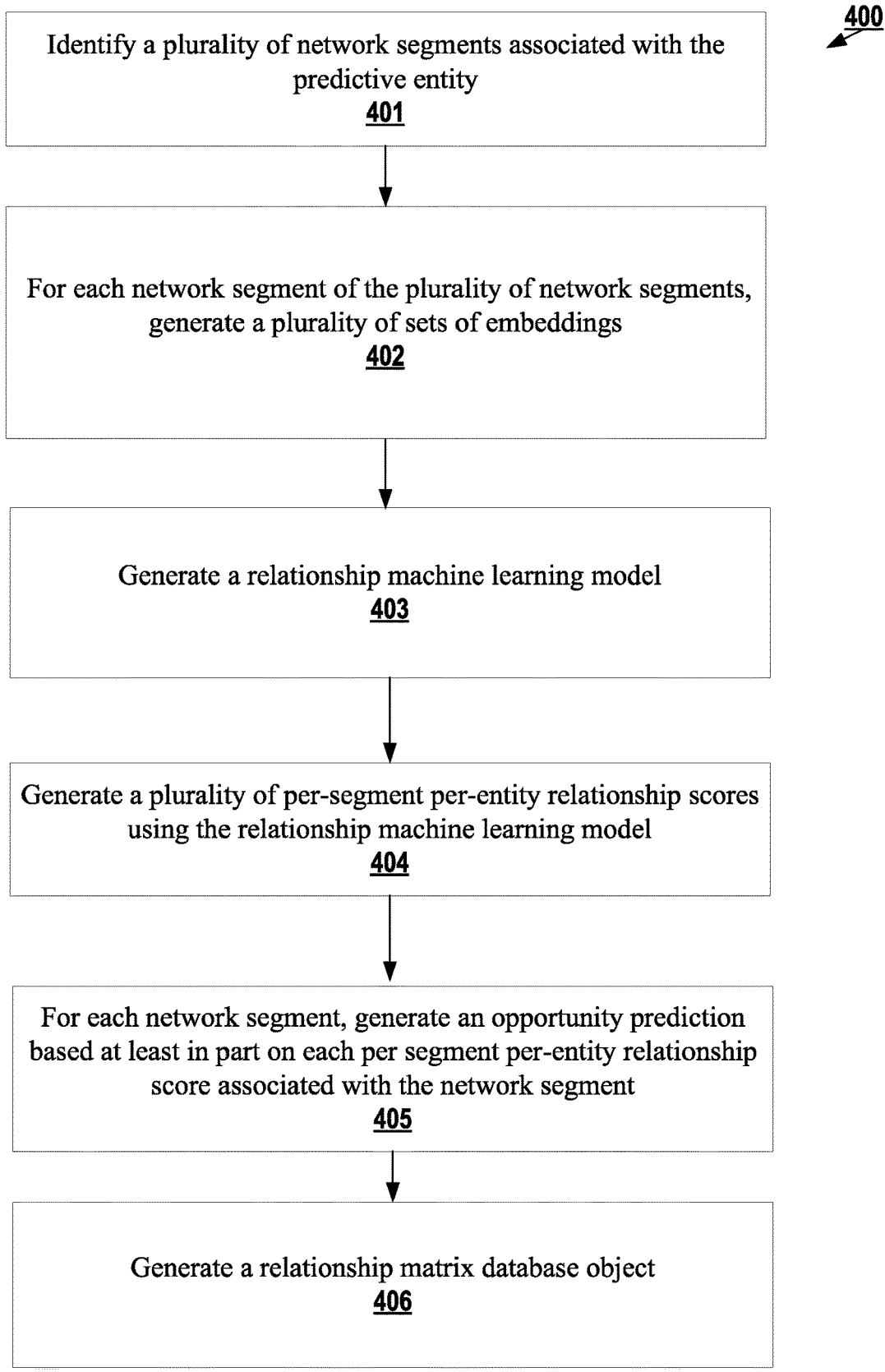

FIG. 4 is a flowchart diagram of an example process for generating a relationship matrix database object in accordance with some embodiments discussed herein.

Figure 5:
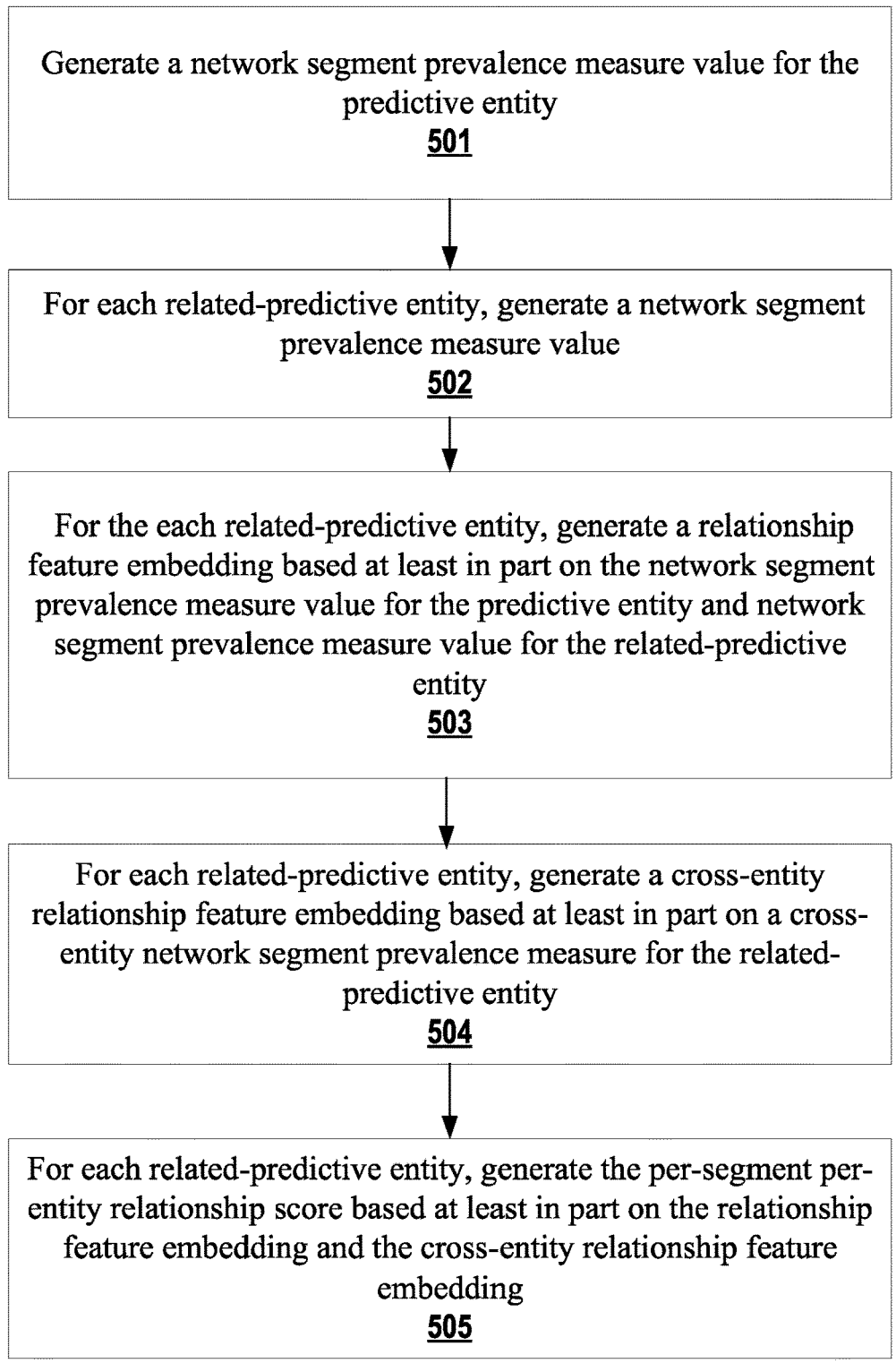

FIG. 5 is a flowchart diagram of an example process for generating per-segment per-entity relationship scores for a particular network segment in accordance with some embodiments discussed herein.

Figure 6:
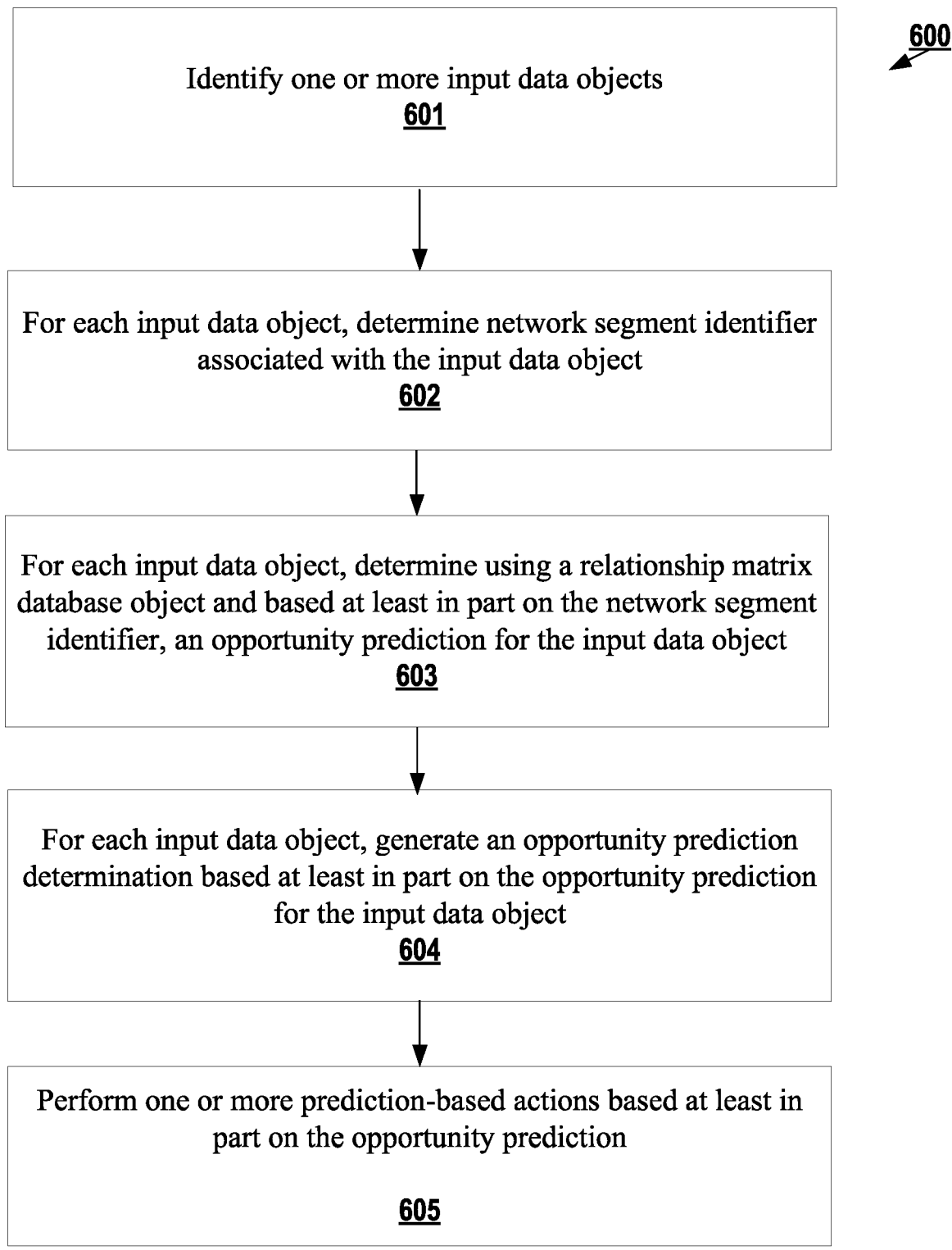

FIG. 6 is a flowchart diagram of an example process for performing predictive data analysis using a relationship matrix database object in accordance with some embodiments discussed herein.

DETAILED DESCRIPTION

Various embodiments of the present disclosure now will be described more fully hereinafter with reference to the accompanying drawings, in which some, but not all, embodiments of the disclosures are shown. Indeed, these disclosures may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present disclosure are described with reference to predictive data analysis, one of ordinary skill in the art will recognize that the disclosed concepts can be used to perform other types of data analysis.

I. Overview and Technical Improvements

Various embodiments of the present disclosure introduce techniques for improving reliability and computational efficiency of investigative predictive data analysis solutions by using a relationship machine learning framework. As further described herein, a relationship machine learning framework may limit real-time computational operations to those configured to generate an opportunity prediction using a relationship matrix database object which can then be used to perform one or more investigative operations, where executing some complex and computational expensive operations in real-time may be eliminated. In this way, by utilizing these techniques, a predictive data analysis system 101 can eliminate the execution of some complex and computational expensive operations, thus removing the number of real-time operations that need to be performed. Accordingly, by using a relationship machine learning framework, various embodiments of the present disclosure reduce the real-time operational load on investigative predictive data analysis solutions and thus improve operational reliability and computational efficiency of investigative predictive data analysis solutions.

Moreover, various embodiments of the present disclosure make important technical contributions to improving resource-usage efficiency of post-prediction systems by using a relationship matrix database object to set the number of allowed computing entities used by the noted post-prediction systems. For example, in some embodiments, a predictive data analysis computing entity generates, determines, and similar words used herein interchangeably D inferred predictions for D input data objects. Then, the count of input data objects that are associated with an affirmative inferred prediction (e.g., positive opportunity prediction), along with a resource utilization ratio for each prediction input data object, can be used to predict a predicted number of computing entities needed to perform post-prediction processing operations (e.g., automated investigative operations) with respect to the D input data objects. For example, in some embodiments, the number of computing entities needed to perform post-prediction processing operations (e.g., automated investigative operations) with respect to D input data objects can be generated based at least in part on the output of the equation: $R=\text{ceil}(\Sigma_k^{k=K} ur_k)$, where R is the predicted number of computing entities needed to perform post-prediction processing operations with respect to the D input data object, ceil(.) is a ceiling function that returns the closest integer that is greater than or equal to the value provided as the input parameter of the ceiling function, k is an index variable that iterates over K input data objects among the D input data objects that are associated with affirmative predictions, and $ur_k$ is the estimated resource utilization ratio for a kth prediction input data object that may be generated based at least in part on the input data object. In some embodiments, once R is generated, the predictive data analysis computing entity can use R to perform operational load balancing for a server system that is configured to perform post-prediction processing operations (e.g., automated investigative operations) with respect to D input data objects. This may be done by allocating computing entities to the post-prediction processing operations if the number of currently-allocated computing entities is below R, and deallocating currently-allocated computing entities if the number of currently-allocated computing entities is above R.

II. Definitions

The term "network segment" may refer to a data construct that is configured to describe a categorical designation of a plurality of categorical designations of a categorical space for an object of interest (e.g., resources, component, members, and/or the like) associated with a predictive entity. An example of a categorical space may include a geographical space (e.g., a continent, a country, a county, a province, a postal code, an area code, and/or the like). In some embodiments, each network segment may be associated with a network segment level of a hierarchical categorical space. For example, each network segment may be associated with a state level categorical space, a county level categorical space, and/or the like. For example, according to one or more embodiments of the present disclosure, each network segment may correspond to a unique county of a plurality of counties associated with a state (e.g., counties in New York, Texas, and/or the like). In some embodiments, one or more relationship features of machine learning-based investigative process may include a network segment-based relationship feature in that the relationship feature may be determined based at least in part on the network segment, and/or otherwise associated with the network segment. In some embodiments, a network segment may be modeled as a predictor feature of a machine learning-based investigative process.

The term "predictive entity" may refer to a data construct configured to describe a real-world entity and/or a virtual entity in relation to which one or more predictive tasks are performed. Examples of a predictive entity may include a server computing entity, a product and/or service provider (e.g., health insurance provider, software application provider, and/or the like). A health insurance provider may describe an entity who provides services and/or products that include financing to cover the costs of healthcare services and/or products rendered to members (e.g., individuals) associated with the health insurance provider. A predictive entity may be associated with one or more objects of interest (e.g., resources, components, members and/or the like) that may be shared, or otherwise associated with another entity (e.g., related-predictive entity) and may be associated with an investigative process to identify the noted objects of interest. For example, a server computing entity may be associated with one or more shared components (e.g., database, microservice, and/or the like) and may be associated with an investigative process, such as a resource allocation and/or resource usage investigation, with respect to the one or more shared components. As another example, a health insurance provider may be associated with one or members that have multiple insurance coverages (e.g., an individual covered under an insurance policy of the health insurance provider and another health insurance provider), and may be associated with an investigative process, such as a coordination of benefits (COB) investigation, by which the health insurance provider determines if a member is covered by more than one health insurance policy at the same time. In some embodiments, the investigative process may be performed using a relationship machine learning framework that includes one or more data processing algorithms for an investigative process and may include one or more predictive data analysis sub-routines. According to one or more embodiments of the present disclosure, a predictive data analysis system may be configured to generate, using a relationship machine learning framework a prediction for each network segment of a plurality of network segments associated with a predictive entity involved in an investigative process, where the prediction for a given network segment may comprise an opportunity prediction that represents a likelihood of irregularities within the network segment. For example, in a COB investigative process, a predictive data analysis system may be configured to generate, using a relationship machine learning framework a prediction for each county of a plurality of counties associated with a healthcare insurance provider involved in the COB investigative process, where the prediction for a given network segment may comprise an opportunity prediction that represents a likelihood that a member of the health insurance provider associated with the network segment is covered under an insurance policy of another health insurance provider with the network segment.

The term "related-predictive entity" may refer to a data construct configured to describe a real-world entity and/or virtual entity (e.g., server computing entity, a service provider, and/or the like) that is associated with one or more network segments associated with a predictive entity and that is deemed an entity of interest with respect to the predictive entity based at least in part on selected criteria. In some embodiments, the selected criteria may include a size measure, network segment prevalence measure, and/or the like. For example, in a resource allocation investigative process, a related-predictive entity may comprise another server computing entity that may share resources with the server computing entity involved in the investigative process and that may have a resource share associated with the network segment that satisfies a threshold value and/or or is among the top N resource shares with respect to each server computing entity associated with the network segment. As another example, in a COB investigative process, an health insurance provider may be deemed an entity of interest with respect to a first health insurance provider if the entity provides substantially similar services and/or products as the first health insurance provider within a network segment associated with the health insurance provider, the entity has a network segment prevalence measure that exceeds a defined threshold and/or the entity has a network segment prevalence measure that is ranked among top N network segment prevalence measures within a network segment of the plurality of network segments associated with the predictive entity.

The term "input data object" may refer to a data construct configured to describe an input to a machine learning framework, such as a relationship machine learning framework, where the input data object may be associated with an investigative process. The input data object, for example, may include a data entity that identifies an object of interest that may be involved in the investigative process. For example, in a resource allocation investigative process for a server computing entity, the input data object may refer to a data entity that describes a component of the server computing entity that mat be a subject of the investigative process. As another example, in a COB investigative process, the input data object may refer to a data entity that describes a member for a COB investigative process that mat be a subject of the investigative process. In the noted COB investigative process example, the member may describe a member (i) having a medical claim, and/or (ii) deemed as likely to have multiple coverage (e.g., multiple policies). In some embodiments, the input data object may be selected from a plurality of similar data objects based at least in part on selection criteria that identify the input data object as a potential object of interest. For example, in the noted COB investigative process example, the input data object may be selected based at least in part on claim-based information and may refer to a data entity that describes a member that has created a new claim, has a probability of making a claim, has a retroactive claim, and/or is otherwise a prospective member of interest.

The term "relationship feature embedding" may refer to a data construct that is configured to describe an attribute or characteristic of a predictive entity that is associated with an attribute or characteristic of a related-predictive entity, and that may be expressed as a vector and may comprise input (e.g., parameter) to a relationship machine learning model configured to generate predicted relationship scores, such as per-segment per-entity relationship scores. In some embodiments, each relationship feature embedding may represent a numerical representation of a network segment prevalence measure of a predictive entity associated with a network segment prevalence measure of a related-predictive entity. In some embodiments, a relationship feature embedding may be generated based at least in part on a relationship feature data object comprising a network segment prevalence measure of the predictive entity and a network segment prevalence measure of a related-predictive entity. In some embodiments, an embedding machine learning model may be used to generate a relationship feature embedding.

The term "network segment prevalence measure" may refer to a data construct that is configured to describe an attribute of an entity, such as a predictive entity or a related-predictive entity, where the network segment prevalence measure values may comprise computed values that may be used to generate per-segment per-entity relationship scores. In some embodiments, a network segment prevalence measure may describe a share of a network segment attributed to an entity (e.g., predictive entity, related-predictive entity), such as share of resources, share of components utilized, market share with respect to a service or product, and/or the like. For example, in a COB investigative process, a network segment prevalence measure may describe a market penetration of a health insurance provider. For example, consider where health insurance provider A is associated with members of county A, a network segment prevalence measure for county A may be determined based at least in part on: (i) the number of individuals within county A that is a member of health insurance provider A (e.g., covered under an insurance policy of the health insurance provider A) and (ii) the number of individuals within county A that is covered under at least one insurance policy offered by a health insurance provider. In some embodiments, each relationship feature embedding for a network segment may be generated based at least in part on the network segment prevalence measure for the predictive entity and a network segment prevalence measure for a corresponding related-predictive entity.

The term "cross-entity relationship feature embedding" may refer to a data construct that is configured to describe a numerical representation of a shared attribute or characteristic associated with a predictive entity that is reflective of a relationship of the predictive entity with a corresponding related-predictive entity, that may be expressed as a vector and that may be used as input (e.g., parameter) to a relationship machine learning model to generate a per-segment per-entity relationship score that may in turn be used to generate opportunity predictions. In some embodiments, a cross-entity relationship feature embedding may represent a numerical representation of a cross-entity network segment prevalence measure. In a COB investigative process, for example, a cross-entity relationship feature embedding may describe a numerical representation of a measure indicative of a number of overlapping members of a predictive entity with a given related-predictive entity.

The term "cross-entity network segment prevalence measure" may refer to a data construct that is configured to describe a network segment prevalence measure of a predictive entity with respect to a network segment that is characterized based at least in part on unidentified shared resources that are shared with a related-predictive entity associated with the network segment. For example, a cross-entity network segment prevalence measure associated with a related-predictive entity may be determined based at least in part on the number of objects of interest (e.g., resources, components, members, and/or the like) of the predictive entity that is known to be shared with the related-predictive entity. In the case of a COB investigative process, for example, a cross-entity network segment prevalence measure value for a first health insurance provider (predictive entity) may refer to a computed value that represents the number of members of the first health insurance provider identified as having insurance coverage with a second health insurance (e.g., having health insurance coverage with the first health insurance provider and the second health insurance provider).

The term "per-segment per-entity relationship score" may refer to a data construct that is configured to describe an output of a relationship machine learning model, where a relationship matrix database object may be generated based at least in part on a plurality of per-segment per-entity relationship scores. Each per-segment per-entity relationship score is associated with a related-predictive entity of one or more related-predictive entities and may be used to determine for a predictive entity, the likelihood of unidentified irregularities within a given network segment. A per-segment per-entity relationship score for a related-predictive entity, for example, may describe a likelihood that the related-predictive entity is associated with an object of interest. For example, in a resource allocation investigative process, a per-segment per-entity relationship score may describe a relationship measure that is indicative of the likelihood that a component of a server computing entity is utilized by another corresponding server computing entity associated with the per-segment per-entity relationship score. As another example, in a COB investigative process, a per-segment per-entity relationship score may describe a relationship measure that is indicative of the likelihood of a member of a health insurance provider having health insurance coverage under a policy of another health insurance provider associated with the per-segment per-entity relationship score. For example, if the predictive entity is health insurance provider A, a per-segment per-entity relationship score for health insurance provider B for network segment C may describe a predicted likelihood that member(s) of health insurance A associated with network segment C may have insurance coverage with health insurance B. In some embodiments, a per-segment per-entity relationship score may be generated using a relationship machine learning model configured to process one or more sets of relationship feature embedding and cross-entity relationship feature embedding to generate the per-segment per-entity relationship scores.

The term "opportunity prediction" may refer to a data construct configured to describe a predicted prospect measure associated with a network segment of a plurality of network segments. According to one or more embodiments of the present disclosure, an opportunity prediction may be generated using a relationship machine learning framework that includes a relationship machine learning model and an aggregation machine learning model. An opportunity prediction may describe the likelihood that a network segment includes unidentified objects of interest (e.g., components of a server computing entity, members of health insurance provider that have insurance coverage with another insurance provider associated with the network segment, and/or the like). Further, an opportunity prediction may indicate the likelihood of a successful investigative process associated with an object of interest based at least in part on the network segment associated with the object of interest. In some embodiments, an opportunity prediction may be generated using an aggregation machine learning model. In some embodiments, the aggregation machine learning model may be configured to perform one or more processing operations that includes a statistically significant per-segment per-entity relationship score variance processing operation, where a given per-segment per-entity relationship score may be compared to a weighted relationship score average measure. The weighted relationship score average measure, for example, may be a network-wise weighted relationship score average. As another example, a weighted relationship score average measure may be a network segment-wise weighted relationship score average associated with a given network segment.

The term "relationship matrix database object" may refer to a data construct configured to describe a data repository that may be utilized in a machine learning-based investigative process. The relationship matrix database object may be configured to store per-segment per-entity relationship scores and associated opportunity predictions for each network segment of a plurality of network segments. According to one or more embodiments of the present disclosure, a relationship matrix database object may comprise a matrix data structure in that data (e.g., per-segment per-entity relationship scores and opportunity predictions stored therein may be represented in a matrix data structure). A relationship matrix database object, for example, may comprise data represented in a matrix data structure format, where the data may include for each network segment of a plurality of network segments: (i) one or more per-segment per-entity relationship scores that are each associated with a related-predictive entity of one or more related-predictive entities, and (ii) an opportunity prediction associated with the network segment.

The term "network segment identifier" may refer to a data construct that is configured to describe a data entity that is configured to uniquely identify a network segment. A network segment identifier may be input to a machine learning framework for investigative process. In some embodiments, the network segment identifier may comprise a unique name of a network segment associated with a resource associated with the input data object. It should be understood, however, that a network segment identifier can be any identifier configured to identify a corresponding network segment. In some embodiments, a predictive opportunity identification sub-routine of a machine learning-based investigative process may be configured to receive a network segment identifier and generate an opportunity prediction with respect to an input data object based at least in part on the received network segment identifier and using a relationship matrix database object.

The term "predictive data analysis sub-routine(s)" may refer to a data entity that describes parameters, hyper-parameters, and/or defined operations of a predictive analysis process. A predictive data analysis sub-routine can include an automated process for processing an input data object in an investigative process. The predictive data analysis sub-routine can include one or more different capabilities that can increase and/or decrease the predictive data analysis sub-routine's efficiency when processing different input data objects. The predictive data analysis sub-routine(s) can include any automated process, machine learning-based or otherwise, that are capable of analyzing data and outputting either additional parameters for the data and/or an indication of whether the data qualified for an investigative process. In this respect, the predictive data analysis sub-routine(s) can depend on the investigative process and/or the functionalities available to a predictive analysis computing entity. Examples of predictive data analysis sub-routine(s) may include a predictive opportunity identification sub-routine, a predictive data verification sub-routine, a robotic data augmentation sub-routine, predictive data augmentation sub-routine, and/or the like.

The term "predictive opportunity identification sub-routine" may refer to a data entity that describes parameters, hyper-parameters, and/or defined operations of a predictive analysis process. A predictive opportunity identification sub-routine, for example, may be configured to output an opportunity prediction for an input data object based at least in part on a network segment identifier associated with the input data object. For example, given a network segment that is a county, the predictive opportunity identification sub-routine may be configured to output an opportunity prediction with respect to an input data object that is indicative of a likelihood of successful investigative process within a county associated with the input data object. In some embodiments, the predictive opportunity identification sub-routine may include a process in which the noted opportunity prediction may be generated using a relationship matrix database object. For example, the predictive opportunity identification sub-routine may include an autoloading sub-routine configured to query one or more databases (e.g., relationship matrix database object) based at least in part on the network segment identifier to identify an opportunity prediction with respect to an input data object. Additionally, and/or alternatively, the predictive opportunity identification sub-routine may be configured to determine one or more qualifying related-predictive entities.

The term "relationship machine learning model" may refer to a data construct that describes parameters, hyper-parameters, and/or defined operations of a machine learning model that is configured to generate predicted per-segment per-entity relationship scores for predictive entities and are characterized by a group of hyper-parameters, where at least a subset of the group of hyper-parameters may optionally be associated with one or more trained parameters (e.g., one or more trained weights, one or more trained bias factors, and/or the like). In general, a hyper-parameter of a relationship machine learning model may be a value that is determined based at least in part on precomputed measures (e.g., based at least in part on network segment prevalence measure for the predictive entity, network segment prevalence measure for a corresponding related-predictive entity, cross-entity network segment prevalence measure, and/or the like) and supplied as predetermined inputs to the relationship machine learning model. In some embodiments, a relationship machine learning model may comprise at least one of one or more rule-based layers or one or more layers that depend on trained parameters).

The term "aggregation machine learning model" may refer to a data construct that describes parameters, hyper-parameters, and/or defined operations of a machine learning model that is configured to generate an opportunity prediction for a corresponding network segment and are characterized by a group of hyper-parameters, where at least a subset of the group of hyper-parameters may optionally be associated with one or more trained parameters (e.g., one or more trained weights, one or more trained bias factors, and/or the like). In general, a hyper-parameter for aggregation machine learning model may be a value that is determined based at least in part on precomputed measures (e.g., based at least in part on per-segment per-entity relationship scores, weighted per-segment per-entity relationship score averages, and/or the like) and supplied as predetermined inputs to the relationship machine learning model. In some embodiments, aggregation machine learning model may comprise at least one of one or more rule-based layers or one or more layers that depend on trained parameters), In some embodiments, the aggregation machine learning model may comprise one or more feedforward neural network layers that are configured to process the per-entity per-segment per-entity relationship scores to generate the opportunity predictions. In some embodiments, inputs to the aggregation machine learning model include a vector describing each per-entity per-segment per-entity relationship score, while outputs of the aggregation machine learning model include a vector describing an opportunity prediction for the corresponding network segment.

The term "qualifying related-predictive entity" may refer to a data construct that is configured to describe a related-predictive entity that is deemed likely to be associated with a likelihood of successful investigation. In the COB investigative process, for example, where a first health insurance provider is the predictive entity, a qualifying related-predictive entity may describe a second health insurance provider that is deemed likely to be associated with members of the first health insurance provider that have multiple insurance coverages (e.g., with the first health insurance provider and the secondary health provider) but yet to be identified as having multiple coverages. In the noted example, a qualifying related-predictive entity may describe a second health insurance provider that if investigated with respect to the input data object is likely to result in a successful investigation.

III. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions.

Accordingly, as described above, various embodiments of the present disclosure make important technical contributions to improving computational efficiency, and speed of predictive data analysis machine learning models by creating a relationship matrix database object describing the opportunity prediction for each network segment, which in turn improves training speed and training efficiency of training predictive machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency—Adaptive On-line Training for Fast and Accurate Natural Language Processing* in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein improve at least one of the computational efficiency, storage-wise efficiency, and speed of training predictive machine learning models.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate revised predictions corresponding to the predictive data analysis requests, provide the revised predictions to the client computing entities 102, and automatically perform prediction-based actions based at least in part on the revised predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Exemplary Predictive Data Analysis Computing Entity

FIG. 2 provides a schematic of a predictive data analysis computing entity 106 according to one embodiment of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

B. Exemplary Client Computing Entity

FIG. 3 provides an illustrative schematic representative of a client computing entity 102 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described below, various embodiments of the present disclosure introduce techniques for improving reliability and computational efficiency of investigative predictive data analysis solutions by using a relationship machine learning framework. As further described herein, a relationship machine learning framework may limit real-time computational operations to those configured to generate an opportunity prediction using a relationship matrix database object, which can then be used to perform one or more investigative operations, where executing some complex and computational expensive operations in real-time may be eliminated. In this way, by utilizing these techniques, a predictive data analysis system 101 can eliminate the execution of some complex and computational expensive operations, thus removing the number of real-time operations that need to be performed. Accordingly, by using a relationship machine learning framework, various embodiments of the present disclosure reduce the real-time operational load on investigative predictive data analysis solutions and thus improve operational reliability and computational efficiency of investigative predictive data analysis solutions.

FIG. 4 is a flowchart diagram of an example process 400 for generating a relationship matrix database object using a relationship machine learning framework in accordance with some embodiments discussed herein. The relationship matrix database object may be used to perform target based investigative predictive data analysis that optimizes various predictive data analysis sub-routines associated with predictive data analysis. The target-based predictive data analysis technique can be implemented by one or more computing devices(s) and/or system(s) described herein. For example, the predictive data analysis computing entity 106 can utilize the relationship matrix database object to overcome the various limitations with conventional disparate predictive data analysis techniques.

Generating Relationship Matrix Database Object

The process 400 begins at step/operation 401 when the predictive data analysis computing entity 106 identifies a plurality of network segments associated with a predictive entity. A network segment may describe a categorical designation of a plurality of categorical designations of a categorical space associated with an object of interest (e.g., resources, component, members, and/or the like) associated with a predictive entity. An example of a categorical space may include a geographical space (e.g., a continent, a country, a county, a province, a postal code, an area code, and/or the like). In some embodiments, each network segment may be associated with a network segment level of a hierarchical categorical space. For example, each network segment may be associated with a state level categorical space, a county, level categorical space, and/or the like. According to one or more embodiments, each network segment corresponds to a county of a plurality of counties, where each county is associated with a given state (e.g., counties within New York, counties within Texas, and/or the like). It should be understood, however, that in other embodiments, each network segment may correspond to a city of a plurality of cities, a state of a plurality of states, and/or the like, or may not comprise a geographical space designation.

A predictive entity may describe a real-world entity and/or a virtual entity in relation to which one or more predictive tasks are performed. A predictive entity, for example, may describe a server computing entity, a product and/or service provider (e.g., health insurance provider, and/or the like). A predictive entity may be associated with resources, components, members and/or the like that may be shared with a related-predictive entity, where a related-predictive entity may describe an entity of interest. A predictive entity may be associated with an investigative process that may include a process in which large amounts of data is analyzed to identify an irregularity that, once identified, may be addressed. For example, a server computing entity may be associated with one or more shared components (e.g., database, microservice, and/or the like), and may be associated with an investigative process, such as a resource allocation and/or resource usage investigation with respect to the one or more shared components. As another example, a health insurance provider may be associated with one or members that have multiple insurance coverages (e.g., an individual covered under an insurance policy of the health insurance provider and another health insurance provider), and may be associated with an investigative process, such as a coordination of benefits (COB) investigation, by which the health insurance provider determines if a member is covered by more than one health insurance policy at the same time.

According to one or more embodiments of the present disclosure, the predictive data analysis system 101 may generate, using a relationship machine learning framework an opportunity prediction for each network segment of the plurality of network segments associated with the predictive entity, where the opportunity prediction for a given network segment may represent a likelihood of irregularities within the network segment. For example, in a COB investigative process (as described above), the predictive data analysis system 101 may generate, using a relationship machine learning framework an opportunity prediction for each county of a plurality of counties associated with a healthcare insurance provider predictive entity involved in the COB investigative process, where the prediction for a given network segment may comprise an opportunity prediction that represents a likelihood that a member of the health insurance provider associated with the network segment is covered under an insurance policy of another health insurance provider with the network segment. A member associated with a health insurance provider may describe an individual who receives healthcare services or products (or any other type of service or product) rendered by a provider and/or who relies on financing from the health insurance provider to cover the costs of the rendered health services or products.

A predictive entity may be associated with a plurality of network segments, in that each resource, component, member, and/or the like associated with the predictive entity may be associated with a network segment of the plurality of network segments. For example, various components of a server computing entity may be located within different network segments (e.g., different states, counties, and/or the like). As another example, members of a health insurance provider may be located within different network segments (e.g., different states, counties, and/or the like). Additionally, and/or alternatively, a predictive entity may be associated with a plurality of network segments in that the predictive entity may operate within the network segment. For example, a health insurance provider may be associated with a network segment where the health insurance provider offers products and/or services, such as one or more counties of one or more states.

A related-predictive entity may describe an entity (e.g., server computing entity, a service provider, and/or the like) that is associated with one or more network segments associated with the predictive entity and that is deemed an entity of interest with respect to the predictive entity based at least in part on selected criteria. In some embodiments, the selected criteria may include a size measure, network segment prevalence measure, and/or the like. For example, in a server computing entity resource allocation investigative process, a related-predictive entity may comprise another server computing entity that may share resources with the server computing entity and that may have a network segment prevalence measure with respect to the network segment that satisfies a defined threshold value and/or or is among the top N network segment prevalence measures with respect to each server computing entity associated with the network segment.

As another example, in a health insurance provider COB investigative process, another health insurance provider may be deemed an entity of interest with respect to the health insurance provider if the another health insurance provider provides substantially similar services and/or products as the health insurance provider within a network segment associated with the health insurance provider, the another health insurance provider has a network segment prevalence measure that exceeds a defined threshold and/or the another health insurance provider has a network segment prevalence measure that is ranked among top N network segment prevalence measures within a network segment of the plurality of network segments associated with the predictive entity. A network segment prevalence measure, according to one or more embodiments, may describe a share of a network segment attributed to an entity (e.g., predictive entity, related-predictive entity), such as share of resources, share of components utilized, market penetration, and/or the like. In a COB investigative process, for example, a network segment prevalence measure may describe a market penetration of a health insurance provider within the network segment.

At step/operation 402, the predictive data analysis computing entity 106 generates, for each network segment of the plurality of network segments, a plurality of sets of embeddings for each network segment of a plurality of network segments, wherein each set of embeddings comprises a relationship feature embedding and a cross-entity relationship feature embedding, and each set of embeddings (e.g., each set of relationship feature embedding and cross-entity relationship feature embedding for a network segment) is associated with a related-predictive entity of a plurality of related-predictive entities. Accordingly, in one or more embodiments, each set of relationship feature embedding and cross-entity relationship feature embedding is associated with a network segment of a plurality of network segments, and each set of relationship feature embedding and cross-entity relationship feature embedding associated with a network segment is associated with a related-predictive entity of a plurality of related predictive entities associated with the network segment. In a COB investigative process by a first health insurance provider, for example, each set of relationship feature embedding and cross-entity relationship feature embedding may be associated with a county of a plurality of counties, and each set of relationship feature embedding and cross-entity relationship feature embedding associated with a county may be associated with another health insurance provider of a plurality of other health insurance providers associated with the county.

A relationship feature embedding may describe a numerical representation of an attribute or characteristic of a predictive entity that is associated with an attribute or characteristic of a related-predictive entity, that may be expressed as a vector and may comprise a parameter of a relationship machine learning model. In some embodiments, a relationship feature may comprise a network segment prevalence measure, where each relationship feature embedding may represent a numerical representation of a network segment prevalence measure of the predictive entity associated with a network segment prevalence measure of a related-predictive entity. In some embodiments, a relationship feature embedding is generated based at least in part on a relationship feature data object that includes a network segment prevalence measure for the predictive entity and a network segment prevalence measure for a related-predictive entity.

As noted above, in some embodiments, a network segment prevalence measure may describe a share of a network segment attributed to an entity, such as a predictive entity and a related-predictive entity. A network segment prevalence measure, for example, may describe a market penetration of an entity such as health insurance provider and may be generated based at least in part on historical data (e.g., internal data of the predictive entity and/or external data received and/or retrieved from one or more external sources). In the case of COB investigative process, for example, consider where health insurance provider A is the predictive entity, health insurance provider B is a related-predictive entity, and the network segment is a county A in a particular state, a network segment prevalence measure value for health insurance A for county A may be generated based at least in part on: (i) the number of individuals within county A that is a member of health insurance provider A (e.g., covered under an insurance policy of health insurance provider A) and (ii) the number of individuals within county A that is covered under at least one insurance policy of a health insurance provider. Continuing with the above example, a network segment prevalence measure for health insurance provider B for county A may be generated based at least in part on: (i) the number of individuals within county A that is a member of health insurance provider B (e.g., covered under an insurance policy of health insurance provider B) and (ii) the number of individuals within county A that is covered under at least one insurance policy of a health insurance provider.

A cross-entity relationship feature embedding may refer to a data construct that is configured to describe a numerical representation of a shared attribute or characteristic associated with a predictive entity that is reflective of a relationship of the predictive entity with a corresponding related-predictive entity, that may be expressed as a vector and may comprise a parameter of a relationship machine learning model. In some embodiments, a cross-entity relationship feature embedding may represent a numerical representation of a cross-entity network segment prevalence measure. A cross-entity network segment prevalence measure may describe a network segment prevalence measure of a predictive entity with respect to a network segment that is characterized based at least in part on unidentified shared resources that are shared with a related-predictive entity associated with the network segment. In a COB investigative process, for example, a cross-entity relationship feature embedding may describe a numerical representation of a measure indicative of a number of overlapping members of a health insurance provider predictive entity with another health insurance provider (e.g., members identified by the health insurance provider predictive entity as having health insurance with the health insurance provider predictive entity and another health insurance provider). In some embodiments, a cross-entity network segment prevalence measure associated with a related-predictive entity may be determined based at least in part on the number of objects of interest (e.g., resources, components, members, and/or the like) of the predictive entity that is known to be shared with the related-predictive entity. In the case of a COB investigative process, for example, a cross-entity network segment prevalence measure value for a first health insurance provider (e.g., example predictive entity) may refer to a computed value that represents the number of members of the first health insurance provider identified as having insurance coverage with a second health insurance (e.g., having health insurance coverage with the first health insurance provider and the second health insurance provider).

At step/operation 403 the predictive data analysis computing entity generates a machine learning model that is configured to process for each network segment, each set of relationship feature embedding and cross-entity relationship feature embedding associated with the network segment to output a plurality of per-segment per-entity relationship scores. In some embodiments, the relationship machine learning model may be characterized by a group of hyper-parameters, where at least a subset of the group of hyper-parameters may optionally be associated with one or more trained parameters, such as one or more trained weights, one or more trained bias factors, and/or the like, where a hyper-parameter of the relationship machine learning model may be a value that is determined based at least in part on precomputed measures (e.g., based at least in part on network segment prevalence measure for the predictive entity, network segment prevalence measure for a corresponding related-predictive entity, cross-entity network segment prevalence measure, and/or the like) and supplied as predetermined inputs to the relationship machine learning model. In some embodiments, the relationship machine learning model may comprise, logistic regression models, naïve bayes models, K-nearest Neighbors, support vector machines, neural networks, classification models, and/or the like. In one or more embodiments, the relationship machine learning comprises generalized linear model characterized by the function:

$$\hat{y}(\text{per-segment per-entity relationship score}) = b0(\text{network segment prevalence measure for predictive entity:network segment prevalence measure for related-predictive entity}) + b1(\text{a cross-entity network segment prevalence measure})x,$$

It should be understood, however, that the relationship machine learning model may comprise any type of machine learning-based model including one or more supervised, unsupervised, and/or reinforcement learning models that is trained using one or more supervised training techniques.

At step/operation 404, the predictive data analysis computing entity 106 generates, using the relationship machine learning model and based at least in part on the plurality of sets of embeddings, a plurality of per-segment per-entity relationship scores, where each per-segment per-entity relationship score corresponds to a related-predictive entity and is associated with a network segment of the plurality of network segments. Each per-segment per-entity relationship score may be generated, using the relationship machine learning model, based at least on a set of relationship feature embedding and cross-entity relationship feature embedding, wherein the per-segment per-entity relationship score (i) corresponds to the related-predictive entity associated with the set of relationship feature embedding and cross-entity relationship feature embedding and (ii) is associated with the corresponding network segment.

A per-segment per-entity relationship score may describe a relationship measure that may be indicative of the likelihood (e.g., probability) of the corresponding related-predictive entity having one or more objects of interest (e.g., resources, component, members, and/or the like) in common with the predictive entity. For example, in a server computing entity resource investigative process, a per-segment per-entity relationship score may describe a relationship measure that is indicative of the likelihood that a component of a server computing entity is utilized by another corresponding server computing entity (e.g., associated with the per-segment per-entity relationship score). As another example, in a COB investigative process, for example, each per-segment per-entity relationship score may describe a measure indicative of the likelihood that the corresponding related-predictive entity has unidentified COB with the predictive entity within the corresponding network segment. For example, if the predictive entity is health insurance provider A, a per-segment per-entity relationship score for health insurance provider B for network segment C may describe a predicted likelihood that member(s) of health insurance A associated with network segment C may have insurance coverage with health insurance provider B. In some embodiments, a per-segment per-entity relationship score may be used to generate for the predictive entity, the likelihood of unidentified irregularities within a given network segment.

In some embodiments, the step/operation 404 may be performed in accordance with the process 500 that is depicted in FIG. 5, which is an example process for generating per-segment per-entity relationship scores for a particular network segment. The process 500 that is depicted in FIG. 5 begins at step/operation 501 when the predictive data analysis computing entity 106 generates, for the particular network segment, a network segment prevalence measure value for the particular network segment.

At step/operation 502, the predictive data analysis computing entity 106 generates, for the particular network segment, a network segment prevalence measure value for each related-predictive entity associated with the particular network segment.

At step/operation 503, the predictive data analysis computing entity 106 generates, for each related-predictive entity associated with the particular network segment, a relationship feature embedding based at least in part on: (i) the network segment prevalence measure value for the predictive entity for the particular network and (ii) the network segment prevalence measure value for the related-predictive entity for the particular network segment. In some embodiments, generating a relationship feature embedding for a particular related-predictive entity may comprise: (i) generating a relationship feature data object that comprises a network segment prevalence measure for the particular network segment and a network segment prevalence measure for the related-predictive entity for the particular network segment and (ii) generating the relationship feature embedding based at least in part on the generated relationship feature data object. In some embodiments, an embedding machine learning model may be used to generate each relationship feature embedding.

At step/operation 504, the predictive data analysis computing entity 106 generates, a cross-entity relationship feature embedding for each related-predictive entity associated with the particular network segment based at least in part on a cross-entity network segment prevalence measure. In some embodiments, the predictive data analysis computing entity 106 may generate each cross-entity network segment prevalence measure value based at least in part on historical data.

At step/operation 505, the predictive data analysis computing entity 106, generates, for each related-predictive entity, using the relationship machine learning model and based at least in part on: (i) the relationship feature embedding for the particular network segment and the (ii) cross-entity relationship feature embedding, the per-segment per-entity relationship score for the related-predictive entity for the particular network segment. Accordingly, in some embodiments, the predictive data analysis computing entity generates a plurality of sets of relationship feature embedding and cross-entity relationship feature embedding for each network segment of the plurality of network segments associated with the predictive entity, where each set of relationship feature embedding and cross-entity relationship feature embedding is associated with a related-predictive entity of a plurality of related-predictive entities. In some embodiments, each relationship feature embedding and cross-entity relationship feature embedding may comprise a parameter of the relationship machine learning model.

Returning to step/operation 405, the predictive data analysis computing entity 106 generates, for each network segment, an opportunity prediction based at least in part on each per-segment per-entity relationship score associated with the network segment. In some embodiments, the opportunity prediction for each network segment may be generated using an aggregation machine learning model, where the aggregation machine learning model may be configured to perform one or more processing operations that includes a statistically significant per-segment per-entity relationship score variance processing operation. In some embodiments, a statistically significant per-segment per-entity relationship score variance processing operation may include comparing one or more (e.g., some, all) per-segment per-entity relationship scores to a relationship score average measure, such as a weighted relationship score average measure. For example, in some embodiments, each opportunity prediction for a given network segment may be generated, using the aggregation machine learning model, based at least in part on determining if one or more per-segment per-entity relationship scores associated with the network segment is below a weighted relationship score average measure and determining if the difference between the weighted relationship score average and the per-segment per-entity relationship score (for per-segment per-entity relationship scores below the weighted relationship score average measure) exceeds a defined threshold. In some embodiments, the weighted relationship score average measure may comprise a network-wise weighted relationship score average. In some embodiments, the weighted relationship score average measure may comprise a network segment-wise weighted relationship score average associated with a particular network segment. For example, consider where each network segment is a county within state A, a network-wise weighted relationship score average may describe a weighted average of per-segment per-entity relationship scores associated with each county associated with state A, and a network segment-wise weighted relationship score average may describe a weighted average of per-segment per-entity relationship scores associated with a particular county within state A.

In some embodiments, each opportunity prediction may comprise a value within a defined numerical range. In some embodiments, an opportunity prediction may comprise a designator (e.g., a positive designator or a negative designator). In some embodiments, an opportunity prediction for a network segment may comprise a positive designator if the difference between the weighted relationship score average measure and the per-segment per-entity relationship score for one or more related-predictive entities associated with the network segment associated with the related-predictive entity exceeds a defined threshold.

At step/operation 406, the predictive data analysis computing entity 106 generates the relationship matrix database object, where the relationship matrix database object may comprise for each network segment, each per-segment per-entity relationship score and associated opportunity prediction for the network segment. In some embodiments, the per-segment per-entity relationship scores and opportunity predictions stored may be represented in a matrix data structure. In some embodiments, the predictive data analysis computing entity 106 may be configured to update the relationship matrix database object based at least in part in response to one or more of: (i) updated network segment prevalence measure for the predictive entity, (ii) updated network segment prevalence measure for a related-predictive entity, and/or (iii) updated cross-entity network segment prevalence measure. In some embodiments, the predictive data analysis computing entity 106 may be configured to update the relationship matrix database object periodically. Additionally, and/or alternatively, the predictive data analysis computing entity 106 may be configured to update the relationship matrix database object in response to one or more defined events associated with predictive entity. In some embodiments, the predictive data analysis computing entity 106 may be configured to receive and/or retrieve updated internal data and/or external data that may be used to determine the noted: (i) updated network segment prevalence measure associated with the predictive entity, (ii) updated network segment prevalence measure for a related-predictive entity, and/or (iii) updated cross-entity network segment prevalence measure for a related-predictive entity.

In some embodiments, the relationship matrix database object may be associated with an opportunity prediction query engine and/or Application Program Interface (API), where the opportunity prediction query engine and/or the API may be configured to enable one or more predictive data analysis sub-routines of a predictive data analysis system 101 to query the relationship matrix database object for an opportunity prediction and/or transmit an opportunity prediction request for an opportunity prediction. The relationship matrix database object, for example, may be utilized by one or more predictive data analysis sub-routines of a machine learning-based investigative process, where a predictive data analysis sub-routine may refer to a data entity that describes parameters, hyper-parameters, and/or defined operations of a predictive analysis process and may include an automated process for processing an input data object associated with an investigative process.

In some embodiments, for example, a predictive opportunity identification sub-routine may be configured to receive a network segment identifier associated with an input data object and generate an opportunity prediction for the input data object based at least in part on the received network segment identifier. In this case, the predictive opportunity identification sub-routine may be associated with an opportunity prediction query engine and/or Application Program Interface (API) that may be used by the predictive opportunity identification sub-routine to query the relationship matrix database object for an opportunity prediction and/or transmit an opportunity prediction request for an opportunity prediction. A predictive opportunity identification sub-routine, for example, may be configured to output an opportunity prediction for an input data object, using a relationship matrix database object, based at least in part on a network segment identifier associated with the input data object. For example, given a network segment that is a county, the predictive opportunity identification sub-routine may be configured to output an opportunity prediction for the input data object that may be indicative of a likelihood of successful investigative process within a county associated with the input data object.

Additionally, and/or alternatively, in some implementations, the relationship matrix database object may be utilized to perform inventory prioritization of predictive input entities, where a predictive input entity may describe an object of interest associated with the predictive entity and with respect to which an investigative process is performed. For example, in the case of a server computing entity resource allocation investigative process, a predictive input entity may comprise a component of the server computing entity. As another example, in the case of a COB investigative process, a predictive input entity may comprise a member of the health insurance provider.

In some embodiments, the predictive data analysis computing entity 106 may perform inventory prioritization, using the relationship matrix database object, based at least in part on the per-segment per-entity relationship score associated with a group of predictive input entities, and/or opportunity prediction associated with the predictive input entities. For example, a first predictive input entity associated with a higher per-segment per-entity relationship scores and/or a positive opportunity prediction based at least in part on the network segment associated with the predictive input entity may be assigned a higher priority (e.g., higher investigation priority) relative to a second predictive input entity associated with lower per-segment per-entity relationship scores and/or negative opportunity prediction.

Machine Learning-Based Investigative Process Using Relationship Matrix Database Object FIG. 6 depicts an operational example of performing a machine-learning based investigative process using a relationship matrix database object. Via the various steps/operations of the process 600, the predictive data analysis computing entity 106, utilizing a relationship machine learning framework, can perform one or more predictive data analysis tasks using the relationship matrix database object to generate a prediction for an input data object.

The process 600 begins at step/operation 601 when the predictive data analysis computing entity 106 identifies one or more input data objects associated with the predictive entity. An input data object, for example, may include a data entity that identifies an object of interest (e.g., a predictive input entity) that may be involved in an investigative process associated with the predictive entity. (e.g., investigative process performed by the predictive entity). In some embodiments, the input data object may be identified by a predictive data analysis sub-routine of one or more predictive data analysis sub-routines associated with an investigative process.

The investigative process may include a process in which large amounts of data is analyzed to identify an irregularity that, once identified, may be addressed. An example investigative process may include a COB investigative process and the input data object may refer to a data entity that describes a member of interest for the COB investigative process that may (i) have a medical claim, and/or (ii) deemed as likely to have multiple coverages (e.g., multiple policies). Each input data object of the one or more input data objects may be selected from a plurality of similar input data objects based at least in part on selection criteria that identify the input data object as an object of interest. For instance, in the case that the investigative process is a COB investigative process, the input data object may be selected based at least in part on claim-based information. The selection criteria, for example, can identify an input data object that is associated with (i) a newly created claim, (ii) a probability of making a claim, (iii) a retroactive claim, and/or the like, and/or (iv) a high likelihood of having multiple insurance coverages. In some embodiments, identifying the one or more input data objects may comprise receiving an opportunity prediction request (e.g., a query) for the one or more input data objects by a predictive opportunity identification sub-routine.

At step/operation 602, the predictive data analysis computing entity 106, for each input data object of the one or more input data objects associated with the predictive entity, determines a network segment identifier associated with the input data object. As noted above, a network segment identifier may describe a data entity that is configured to uniquely identify a network segment. In some embodiments, the network segment identifier associated with an input data object may be determined based at least in part on the opportunity prediction request and or query generated by a predictive data analysis sub-routine associated with an investigative process, such as a COB investigative process.

For example, each opportunity prediction request and/or query may include a network segment identifier associated with each input data object.

At step/operation 603, the predictive data analysis computing entity 106 generates, for each input data object, using a relationship matrix database object and based at least in part on the network segment identifier for the input data object, an opportunity prediction for the input data object.

At step/operation 604, the predictive data analysis computing entity 106 generates, for each input data object an opportunity prediction determination based at least in part on the opportunity prediction for the input data object. An opportunity prediction determination may describe a determination whether the input data object comprise a positive opportunity prediction (e.g., associated with a positive designator, exceeds a configurable threshold, and/or the like). For example, an opportunity prediction determination, may be generated based at least in part on the opportunity prediction associated with the network segment identified by the network segment identifier. Accordingly, in some embodiments, generating an opportunity prediction determination may comprise: (i) identifying the corresponding network segment based at least in part on the network segment identifier, (ii) identifying from the relationship matrix database object, the opportunity prediction associated with identified network segment identifier, (iii) retrieving from the relationship matrix database object, the opportunity prediction associated with the segment, and (iv) determining whether the opportunity prediction is associated with a positive designator or a negative designator. In implementations where the opportunity prediction comprises a numerical range, a positive designator may be defined based at least in part on a threshold where opportunity prediction values that exceed the threshold may be deemed positive opportunity predictions, and opportunity prediction values that fail to exceed the threshold may be deemed negative opportunity predictions.

In some embodiments, in response to determining that the opportunity prediction associated with the input data object is associated with a positive opportunity prediction, the predictive data analysis computing entity 106, generates output data. The output data may include one or more qualifying related-predictive entities. A qualifying related-predictive entity may describe a related-predictive entity that is deemed likely to be associated with a likelihood of successful investigation. In the COB investigative process, for example, where a first health insurance provider is the predictive entity, a qualifying related-predictive entity may describe a second health insurance provider that is deemed as likely to be associated with members of the first health insurance provider that have multiple coverages (e.g., with the first health insurance provider and the secondary health provider) but the members have yet to be identified as having multiple insurance coverages or have been identified as having multiple coverages but the health insurance coverage with whom the members have the other insurance coverages are unknown. In the noted example, a qualifying related-predictive entity may describe a second health insurance provider that if investigated with respect to the input data object is likely to result in a successful investigation.

Additionally, and/or alternatively, in some embodiments, in response to the opportunity prediction comprising a positive opportunity prediction, the predictive data analysis computing entity 106 may perform one or more verification processing operations, where the one or more verification processing operations may include performing an Application Programming Interface (API) call. For example, in a COB investigative process, a clearing house API eligibility validation may be performed to an opportunity prediction comprising a positive opportunity prediction.

At step/operation 605, the predictive data analysis computing entity 106 performs one or more prediction-based actions based at least in part on the opportunity prediction and/or the opportunity prediction determination. Examples of prediction-based actions include generating a network segment priority user interface and rendering the network segment priority user interface for display on one or more computing entities. In some embodiments, the network segment priority user interface may comprise a ranked order list of network segments based at least in part on the opportunity prediction associated with each network segment, where the ranked order list of network segments may indicate network segments that are most likely to yield successful results with respect to an investigative process ranked, and each network segment may be ranked, for example, in order of most likely to least likely to yield successful investigative results. Another example of a prediction-based action includes generating a predictive input entity priority user interface and rendering the predictive input entity priority user interface for display on one or more computing entities. In some embodiments, the predictive input entity priority user interface may comprise a ranked order list of predictive input entities (e.g., associated with the input data objects) based at least in part on the opportunity prediction determination associated with the predictive input entities. For example, in a COB investigative process, the predictive input entity priority user interface may comprise a priority ranked order list of a plurality of members of interest (e.g., members identified as likely to have COB and/or otherwise associated with a COB investigative process) based at least in part on the opportunity prediction associated with each member, where each member of the of the plurality of members of interest may be associated with a priority order value indicative of the likelihood that the corresponding member is likely to have COB and/or yield a successful COB investigative result.

Accordingly, as described above, various embodiments of the present disclosure make important technical contributions to improving computational efficiency, and speed of predictive data analysis machine learning models by performing predictive analysis using a relationship matrix database object that comprise an opportunity prediction for each network segment of a plurality of network segments, which reduces the amount of extensive investigation that would otherwise be required, which in turn improves training speed and training efficiency of training predictive machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency—Adaptive On-line Training for Fast and Accurate Natural Language Processing* in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein improve at least one of the computational efficiency, storage-wise efficiency, and speed of training predictive machine learning models.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
generating, using one or more processors, a plurality of sets of embeddings for each network segment of a plurality of network segments, wherein (a) the plurality of network segments is associated with a predictive entity, (b) each set of embeddings comprises a relationship feature embedding and a cross-entity relationship feature embedding, and (c) each set of embeddings is associated with a related-predictive entity of a plurality of related-predictive entities;
generating, using the one or more processors and a relationship machine-learning framework and based at least in part on the plurality of sets of embeddings, a relationship matrix database object, wherein:
 (i) the relationship matrix database object is associated with an opportunity prediction query engine and comprises, for each network segment of the plurality of network segments: (1) a plurality of per-segment per-entity relationship scores, each per-segment per-entity relationship score associated with a corresponding related-predictive entity of the plurality of related-predictive entities, and (2) an opportunity prediction of a plurality of opportunity predictions,
 (ii) the relationship matrix database object is generated using a relationship machine learning model, the relationship machine learning model configured to generate the plurality of per-segment per-entity relationship scores based at least in part on each set of embeddings, and
 (iii) the plurality of opportunity predictions is generated based at least in part on the plurality of per-segment per-entity relationship scores;
identifying, using the one or more processors, one or more input data objects; and
for each input data object of the one or more input data objects:
 generating, using the one or more processors and based at least in part on the relationship matrix database object and a network segment identifier associated with the input data object, a corresponding opportunity prediction for the input data object; and initiating, using the one or more processors, the performance of one or more prediction-based actions based at least in part on the corresponding opportunity prediction.

2. The computer-implemented method of claim 1, wherein for each network segment, each relationship feature embedding associated with a related-predictive entity is generated based at least in part on a relationship feature data object for the related-predictive entity, wherein the relationship feature data object comprises a network segment prevalence measure for the predictive entity and a network segment prevalence measure for the related-predictive entity.

3. The computer-implemented method of claim 2, wherein determining the corresponding opportunity prediction for the input data object comprises querying, using the one or more processors and the opportunity prediction query engine, the relationship matrix database object for the corresponding opportunity prediction.

4. The computer-implemented method of claim 1, further comprising:
in response to the opportunity prediction comprising a positive opportunity prediction, performing one or more verification processing operations.

5. The computer-implemented method of claim 4, wherein the one or more verification processing operations comprise performing an Application Programming Interface (API) call.

6. The computer-implemented method of claim 1, wherein the relationship machine learning model comprises a generalized linear model.

7. The computer-implemented method of claim 1, wherein generating the opportunity prediction for each network segment comprises comparing one or more per-segment per-entity relationship scores associated with the network segment to a weighted relationship score average measure.

8. The computer-implemented method of claim 1, wherein the one or more prediction-based actions comprise generating a network segment priority user interface.

9. A system comprising one or more processors and at least one memory storing processor-executable instructions that, when executed by the one or more processors, cause the one or more processors to perform operations comprising:
generating a plurality of sets of embeddings for each network segment of a plurality of network segments, wherein (a) the plurality of network segments is associated with a predictive entity, (b) each set of embeddings comprises a relationship feature embedding and a cross-entity relationship feature embedding, and (c) each set of embeddings is associated with a related-predictive entity of a plurality of related-predictive entities;
generating, using a relationship machine-learning framework and based at least in part on the plurality of sets of embeddings, a relationship matrix database object, wherein:
 (i) the relationship matrix database object is associated with an opportunity prediction query engine and comprises, for each network segment of the plurality of network segments: (1) a plurality of per-segment per-entity relationship scores, each per-segment per-entity relationship score associated with a corresponding related-predictive entity of the plurality of related-predictive entities, and (2) an opportunity prediction of a plurality of opportunity predictions, (ii) the relationship matrix database object is generated using a relationship machine learning model, the relationship machine learning model configured to generate the plurality of per-segment per-entity relationship scores based at least in part on each set of embeddings, and (iii) the plurality of opportunity predictions is generated based at least in part on the plurality of per-segment per-entity relationship scores;

identifying one or more input data objects; and for each input data object of the one or more input data objects:

generating, based at least in part on the relationship matrix database object and a network segment identifier associated with the input data object, a corresponding opportunity prediction for the input data object; and initiating the performance of one or more prediction-based actions based at least in part on the corresponding opportunity prediction.

10. The system of claim 9, wherein for each network segment, each relationship feature embedding associated with a related-predictive entity is generated based at least in part on a relationship feature data object for the related-predictive entity, wherein the relationship feature data object comprises a network segment prevalence measure for the predictive entity and a network segment prevalence measure for the related-predictive entity.

11. The system of claim 10, wherein determining the corresponding opportunity prediction for the input data object comprises querying, using the opportunity prediction query engine, the relationship matrix database object for the corresponding opportunity prediction.

12. The system of claim 9, wherein the operations further comprise:

in response to the opportunity prediction comprising a positive opportunity prediction, performing one or more verification processing operations.

13. The system of claim 12, wherein the one or more verification processing operations comprise performing an Application Programming Interface (API) call.

14. The system of claim 9, wherein the relationship machine learning model comprises a generalized linear model.

15. The system of claim 9, wherein generating the opportunity prediction for each network segment comprises comparing one or more per-segment per-entity relationship scores associated with the network segment to a weighted relationship score average measure.

16. The system of claim 9, wherein the one or more prediction-based actions comprise generating a network segment priority user interface.

17. One or more non-transitory computer-readable storage media including instructions that, when executed by one or more processors, cause the one or more processors to perform operations comprising:

generating a plurality of sets of embeddings for each network segment of a plurality of network segments, wherein (a) the plurality of network segments is associated with a predictive entity, (b) each set of embeddings comprises a relationship feature embedding and a cross-entity relationship feature embedding, and (c) each set of embeddings is associated with a related-predictive entity of a plurality of related-predictive entities;

generating, using a relationship machine-learning framework and based at least in part on the plurality of sets of embeddings, a relationship matrix database object, wherein:

(i) the relationship matrix database object is associated with an opportunity prediction query engine and comprises, for each network segment of the plurality of network segments: (1) a plurality of per-segment per-entity relationship scores, each per-segment per-entity relationship score associated with a corresponding related-predictive entity of the plurality of related-predictive entities, and (2) an opportunity prediction of a plurality of opportunity predictions, (ii) the relationship matrix database object is generated using a relationship machine learning model, the relationship machine learning model configured to generate the plurality of per-segment per-entity relationship scores based at least in part on each set of embeddings, and (iii) the plurality of opportunity predictions is generated based at least in part on the plurality of per-segment per-entity relationship scores;

identifying one or more input data objects;

for each input data object of the one or more input data objects:

generating, based at least in part on the relationship matrix database object and a network segment identifier associated with the input data object, a corresponding opportunity prediction for the input data object; and initiating the performance of one or more prediction-based actions based at least in part on the corresponding opportunity prediction.

18. The one or more non-transitory computer-readable storage media of claim 17, wherein for each network segment, each relationship feature embedding associated with a related-predictive entity is generated based at least in part on a relationship feature data object for the related-predictive entity, wherein the relationship feature data object comprises a network segment prevalence measure for the predictive entity and a network segment prevalence measure for the related-predictive entity.

19. The one or more non-transitory computer-readable storage media of claim 17, wherein determining the corresponding opportunity prediction for the input data object comprises querying, using the opportunity prediction query engine, the relationship matrix database object for the corresponding opportunity prediction.

20. The one or more non-transitory computer-readable storage media of claim 17, wherein the operations further comprise:

in response to the opportunity prediction comprising a positive opportunity prediction, performing one or more verification processing operations.

* * * * *